US012686054B2

(12) United States Patent
Doublet et al.

(10) Patent No.: US 12,686,054 B2
(45) Date of Patent: Jul. 21, 2026

(54) DEVICE AND METHOD FOR PRODUCING METAL POWDERS

(71) Applicant: L'AIR LIQUIDE SOCIÉTÉ ANONYME POUR L'ÉTUDE ET L'EXPLOITATION DES PROCÉDÉS GEORGES CLAUDE, Paris (FR)

(72) Inventors: Sébastien Doublet, Jouy-en-Josas (FR); Eric Verna, Jouy-en-Josas (FR); Olivier Debellemaniere, Jouy-en-Josas (FR)

(73) Assignee: L'Air Liquide Société Anonyme pour l'Etude et l'Exploitation des Procédés George Claude, Paris (FR)

( * ) Notice: Subject to any disclaimer, the term of this patent is extended or adjusted under 35 U.S.C. 154(b) by 454 days.

(21) Appl. No.: 18/246,784

(22) PCT Filed: Sep. 27, 2021

(86) PCT No.: PCT/EP2021/076490
§ 371 (c)(1),
(2) Date: Mar. 27, 2023

(87) PCT Pub. No.: WO2022/069404
PCT Pub. Date: Apr. 7, 2022

(65) Prior Publication Data
US 2023/0356296 A1 Nov. 9, 2023

(30) Foreign Application Priority Data
Sep. 29, 2020 (FR) ....................................... 2009909

(51) Int. Cl.
*B22F 9/08* (2006.01)
*B05B 7/22* (2006.01)
(Continued)

(52) U.S. Cl.
CPC .............. *B22F 9/082* (2013.01); *B05B 7/224* (2013.01); *B22F 1/065* (2022.01); *B22F 1/145* (2022.01);
(Continued)

(58) Field of Classification Search
CPC ............... C01B 13/34; B22F 2009/086; B22F 2009/0864; B22F 2009/0868;
(Continued)

(56) References Cited

U.S. PATENT DOCUMENTS 5,147,448 A * 9/1992 Roberts ................... B22F 1/145 75/346
6,007,183 A * 12/1999 Horine .................... B22F 3/115 75/335
(Continued)

FOREIGN PATENT DOCUMENTS

CN 104325147 A * 2/2015
CN 111299601 A 6/2020
EP 3 243 587 A1 11/2017

OTHER PUBLICATIONS

International Search Report as issued in International Patent Application No. PCT/EP2021/076490, dated Jan. 4, 2022.

*Primary Examiner* — Vanessa T. Luk
(74) *Attorney, Agent, or Firm* — Allen E. White; Christophe Lair

(57) ABSTRACT

A method of manufacturing powder from a first and a second materials for use in additive manufacturing, the manufacturing process including melting the first and second materials by an electric arc; spraying the melted materials so as to form droplets; cooling the droplets by a carrier gas so as to form solid particles; separating the solid particles from the carrier gas and collecting the solid particles so as to form the
(Continued)

powder; and enriching the droplets and/or the particles by means of an active substance.

16 Claims, 5 Drawing Sheets

(51) Int. Cl.
*B22F 1/065* (2022.01)
*B22F 1/145* (2022.01)

(52) U.S. Cl.
CPC ................. *B22F 2009/0844* (2013.01); *B22F 2009/0848* (2013.01); *B22F 2009/0876* (2013.01); *B22F 2009/0896* (2013.01); *B22F 2998/10* (2013.01)

(58) Field of Classification Search
CPC ...... B22F 2009/0872; B22F 2009/0876; B22F 2009/0848; B22F 2009/0852; B22F 2009/0856; B22F 2009/0824; B22F 2009/0828; B22F 2009/0832; B22F 2009/0836; B22F 2009/084; B22F 2009/0844; B22F 9/082
See application file for complete search history.

(56) References Cited

U.S. PATENT DOCUMENTS

| | | | | |
|---|---|---|---|---|
| 6,398,125 | B1 | 6/2002 | Liu et al. | |
| 6,444,009 | B1 | 9/2002 | Liu et al. | |
| 2003/0178104 | A1* | 9/2003 | Sekine | B22F 1/08 266/202 |
| 2008/0038555 | A1* | 2/2008 | Sekine | B22F 9/002 264/483 |
| 2008/0271568 | A1* | 11/2008 | Dunkley | B22F 9/082 425/7 |
| 2013/0040067 | A1* | 2/2013 | Kennedy | B22D 35/02 427/595 |
| 2016/0257566 | A1 | 9/2016 | Liu et al. | |

* cited by examiner

[Fig. 1a]
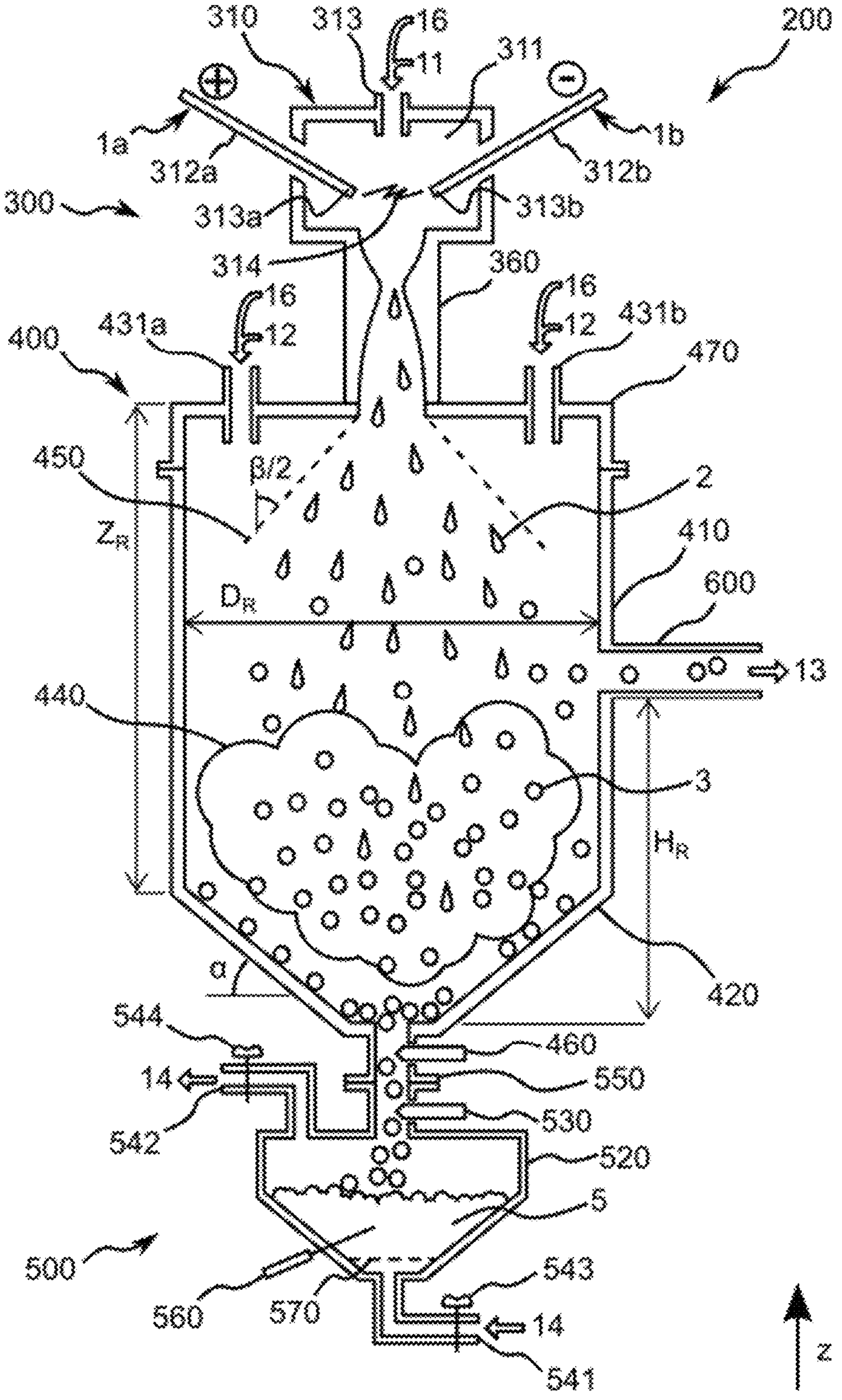

[Fig. 1b]
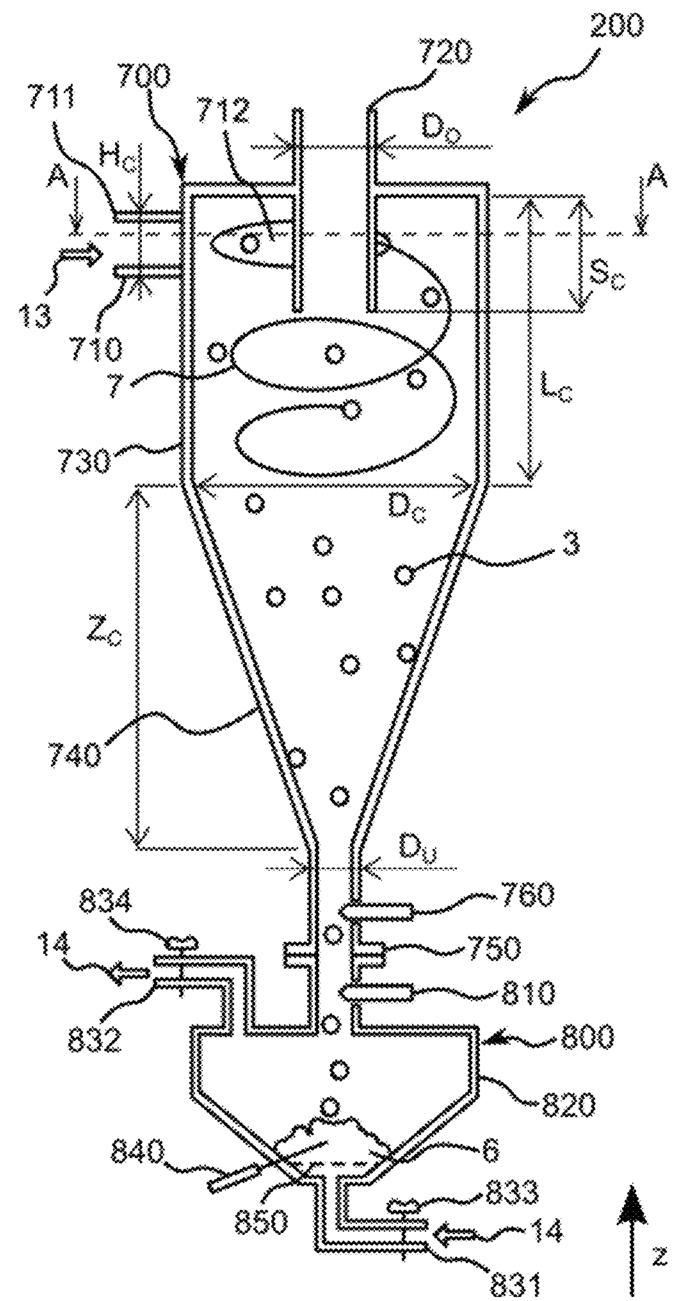

[Fig. 1c]
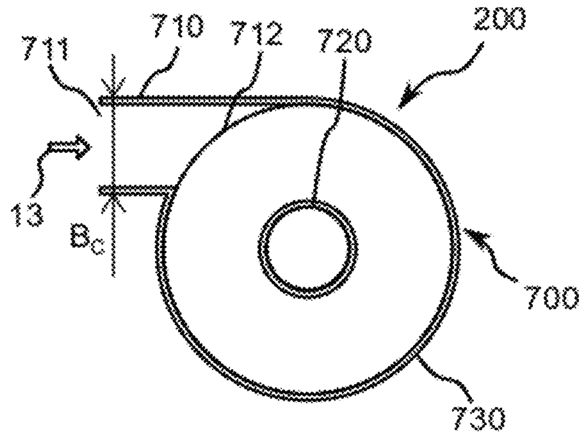
[Fig. 2]
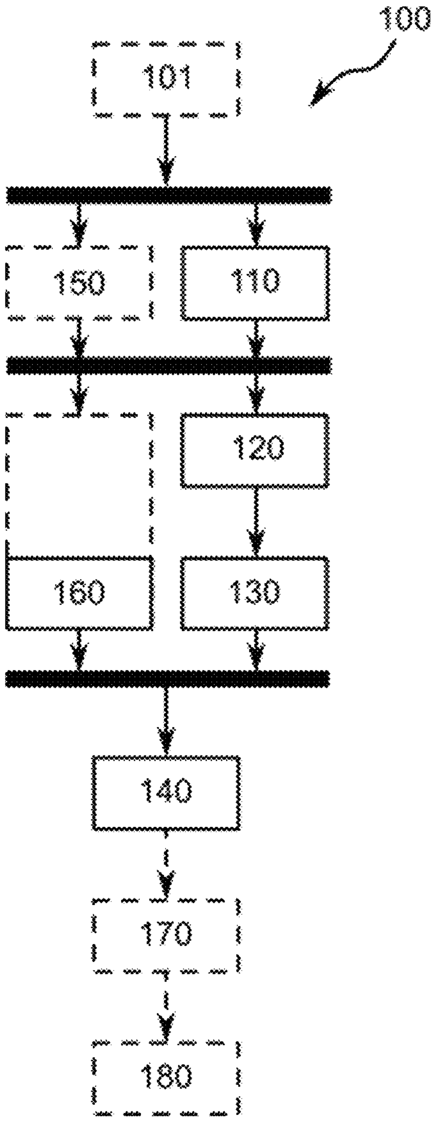

[Fig. 3]
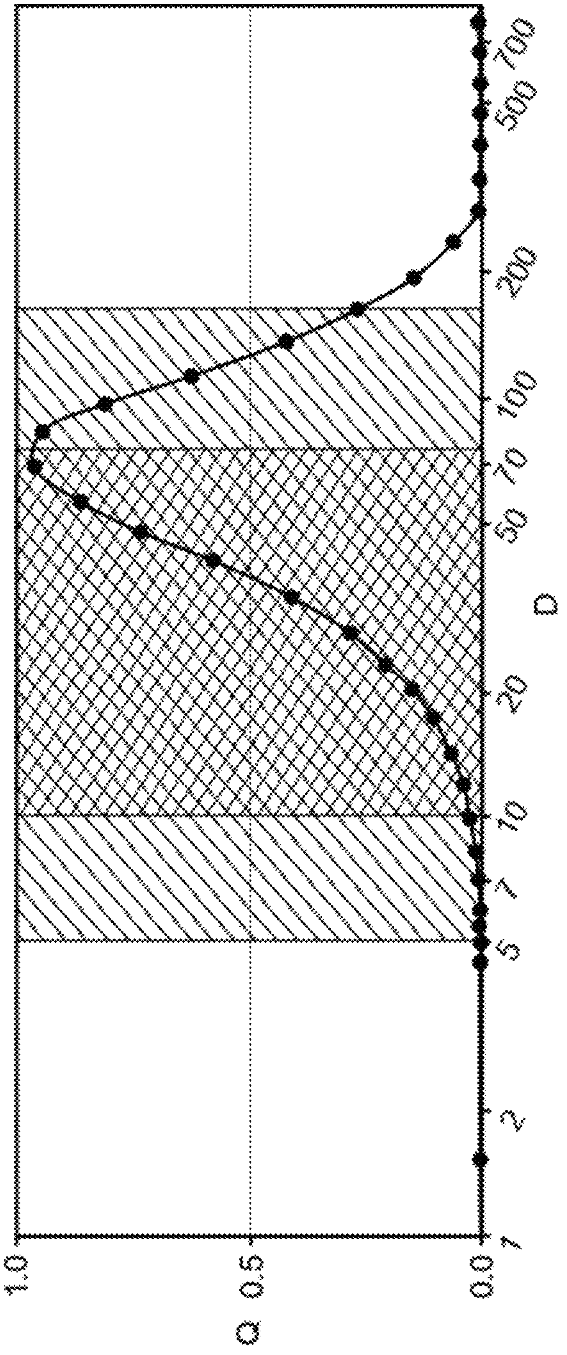

[Fig. 4a]
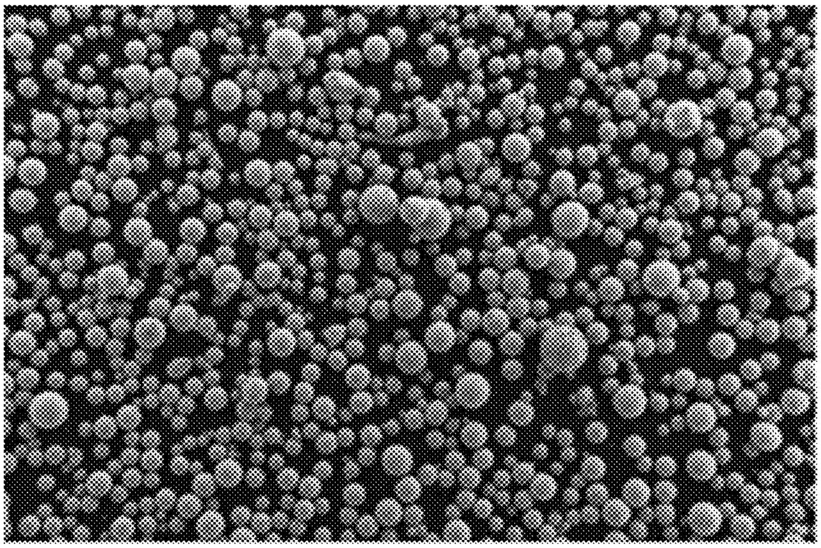
200 µm
[Fig. 4b]
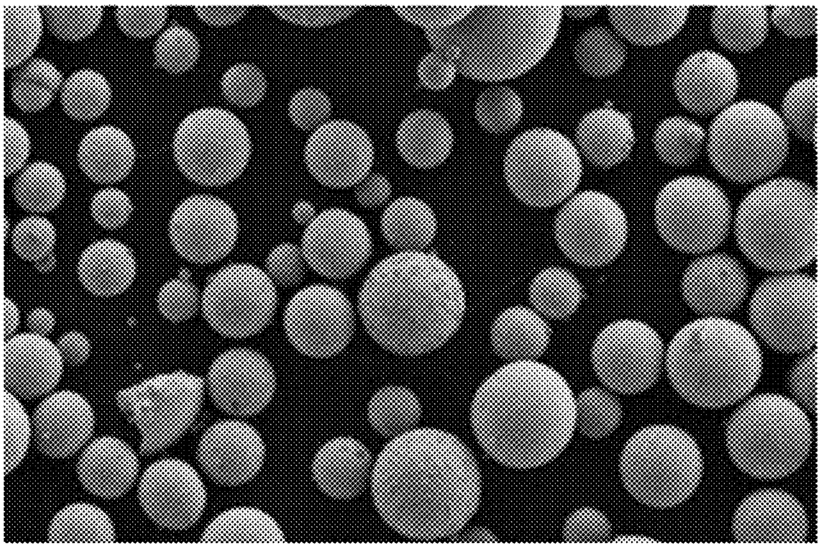
100 µm

DEVICE AND METHOD FOR PRODUCING METAL POWDERS

CROSS-REFERENCE TO RELATED APPLICATIONS

This application is the U.S. National Stage of PCT/EP2021/076490, filed Sep. 27, 2021, which in turn claims priority to French patent application number 2009909, filed Sep. 29, 2020. The content of these applications are incorporated herein by reference in their entireties.

TECHNICAL FIELD OF THE INVENTION

The technical field of the invention is the production of metal powders and in particular metal powders for additive manufacturing methods.

TECHNOLOGICAL BACKGROUND OF THE INVENTION

Technological advances in additive manufacturing methods make it possible to produce metal parts with complex geometries and optimised designs in terms of performance. These methods make it possible to produce, for example, parts with the same mechanical properties as those produced by conventional methods (by casting or forging) while "adding material" only where required, thereby optimising the mass of these components. This represents a major challenge in the transport industry, such as aeronautics, in order to reduce fuel consumption and $CO_2$ emissions.

Additive manufacturing methods involve the use of large quantities of micrometre sized metal powders, with a particle size distribution of between 5 μm and 150 μm, of various alloys, such as titanium, aluminium, nickel, copper or iron-based alloys. These methods offer great freedom of design but at the same time require a high level of powder quality. For example, quality criteria for the particles forming the powders are:

- a sphericity of the particles, typically greater than 0.9, the perfect sphere having a value of 1;
- an absence of small grains attached to the surface of the particles, called satellites;
- a particle size distribution, between 5 μm and 150 μm and more particularly 10 μm and 63 μm;
- the median of the particle size distribution, generally noted as $D_{50}$, having especially to be constant from one batch to another;
- a chemical composition of the particles which should be stable over time;
- the chemical composition of the particles including a low content of chemical compounds that may generate undesirable compounds or phases in parts resulting from additive manufacturing, such as nitrogen, carbon, oxygen or even hydrogen.

Patent U.S. Pat. No. 6,398,125 relates to a two-step method for the production of metal powders comprising a first step of heating and spraying by a thermal spraying apparatus, of the wire arc type, followed by a second step of atomisation in a second chamber where a gas mixture including reactive elements can be employed. However, the particles manufactured by this method are nanometre-sized, too small to be implemented in additive manufacturing methods.

SUMMARY OF THE INVENTION

The invention offers a solution to the problems discussed previously, by providing a method for manufacturing metal powders that meets quality criteria expected by additive manufacturing methods, especially making it possible to obtain particles whose physical and chemical properties are controlled and reproducible.

The invention relates to a method for manufacturing powder from a first material and a second material, the method comprising:

- a step of melting the first and second materials, by means of an electric arc;
- a step of spraying the first and second materials molten so as to form droplets;
- a step of cooling the droplets by means of a carrier gas so as to form solid particles;
- a step of enriching the droplets and/or particles with an active substance, implemented during the cooling step; and a step of separating the solid particles from the carrier gas and collecting the solid particles so as to form the powder.

The cooling step allows the droplets to spheroidise and solidify into particles. The droplets assume a spherical shape by virtue of the surface tension on the surface of the molten metal and the interaction with the carrier gas present in the manufacturing device. The carrier gas, carrying the droplets and particles, limits interactions of the forming particles with other particles, other droplets or the walls of the manufacturing device. This limits formation of aggregates or adhesion of satellites to the powder grains. The method thus makes it possible to obtain a sphericity of the particles as expected by the additive manufacturing methods and a reproducible particle size distribution. By virtue of the enrichment step, the chemical composition of the particles is controlled.

In addition to the characteristics just discussed in the previous paragraphs, the method may have one or more of the following additional characteristics, considered individually or according to any technically possible combinations.

Preferably, the active substance comprises:

- at least one neutral gas; and
- at least one active compound comprising at least one of the following atoms: oxygen, nitrogen, carbon or hydrogen;

each active compound being in the gas, liquid or solid phase, the content of each active compound being between 5 ppm and 20,000 ppm. Even more preferably, the content of each active compound is between 5 ppm and 1000 ppm. For example, each active compound may be carbon monoxide or methane.

Advantageously, at least one active compound of the active substance is in liquid phase.

Advantageously, at least one active compound of the active substance is in solid phase.

Preferably, the enrichment step is implemented during the spraying and cooling steps.

Preferably, the enrichment step is preceded by a step of ionising the active substance.

Preferably, in addition to the carrier gas, the cooling step is performed by means of a cooling gas.

Preferably, further to the carrier gas, the cooling step is carried out by means of a gas buffer. Within the gas buffer, the droplets and/or particles are slowed down for limiting interaction of the particles with the walls of the device.

Preferably, the temperature of the gas buffer is kept below 400° C. Even more preferably, the temperature of the gas buffer is kept lower than or equal to 100° C.

Preferably, the cooling mixture is injected at a temperature below 50° C. Even more preferably, the cooling gas is injected at a temperature of 30° C. or less.

Preferably, the manufacturing method is carried out in sequences. Even more preferably, the sequences are spaced by times of cooling the gas buffer.

Preferably, the gas buffer comprises a gas of high density, such as argon. The densities are preferably compared at standard temperature and pressure conditions.

Preferably, the gas speed within the gas buffer is less than 1 m/s.

Preferably, the method steps are implemented by a manufacturing device, said method comprising a step of inerting the manufacturing device by means of a neutral gas, for purging the manufacturing device, the melting step being triggered subsequently to the inerting step.

Advantageously, the collection step is followed by a step of passivating the particles.

Advantageously, the first and second materials are electrically conductive.

Advantageously, each material is a pure metal or an alloy.

According to a first alternative of the method, the passivation step is triggered when the maximum temperature of the powder is below a threshold temperature. The threshold temperature is, for example, 40° C.

According to a second alternative of the method, the passivation step is triggered after a set waiting time.

According to a third alternative of the method, the duration of the passivation step is controlled according to the temperature of the powder.

According to a fourth alternative of the method, the duration of the passivation step is set.

Advantageously, at least one of the materials comprises a reagent. The reagent is chosen to provide physico-chemical characteristics to the materials during the spraying step. The physico-chemical characteristics are, for example, flowability, oxygen content, nitrogen content or its affinity with a passivation gas. Even more advantageously, the reagent is alphagenic, betagenic or gammagenic and allows the metallurgical phase of the particles to be modified.

The invention also relates to a device for manufacturing powder from a first material and a second material, configured to carry out the manufacturing method including any of the aforementioned characteristics, the manufacturing device including:

- a spraying means;
- an atomisation chamber;
- a first collection means; and
- an exhaust means, connected to the atomisation chamber so as to create a gas buffer.

Droplets entering the spray chamber have a high speed, close to supersonic speed. During cooling, the cooled droplets and particles are slowed down by the gas buffer before they come into contact with the walls of the manufacturing device, allowing the particles to remain undeformed. By virtue of the gas buffer, the particles maintain a high sphericity.

In addition to the characteristics just discussed in the previous paragraphs, the device may have one or more of the following additional characteristics, considered individually or according to any technically possible combinations.

Advantageously, the atomisation chamber is vertically oriented.

Advantageously, the spraying means is vertically oriented and downwardly directed.

Advantageously, the atomisation chamber includes a cylindrical part with a diameter greater than or equal to 500 mm and a height between three and six times the diameter.

Preferably, the exhaust means is connected to the spray chamber at a height from the lowest point of the spray chamber greater than 500 mm.

Preferably, a heat regulation system is installed on the walls of the spray chamber. The heat regulation system may implement a heat transfer fluid circulation.

Preferably, the spraying means comprises a wire arc torch configured to generate an electric arc between the first material and the second material.

Preferably, the manufacturing device includes a gas/particle separation system connected to the exhaust means, the gas/particle separation system including an outlet connected to a second collection means.

Advantageously, the gas/particle separation system is a cyclone.

The invention also relates to an active substance comprising:

- at least one neutral gas; and
- at least one active compound in the gas phase from oxygen, nitrogen, carbon monoxide, hydrogen or methane;

the content of each active compound being between 5 ppm and 20,000 ppm and preferably between 5 ppm and 1000 ppm.

Advantageously, at least one active compound of the active substance is in liquid phase.

Advantageously, at least one active compound of the active substance is in solid phase.

The invention and its various applications will be better understood upon reading the following description and upon examining the accompanying figures.

BRIEF DESCRIPTION OF THE FIGURES

The figures are set forth by way of illustrating and are in no way limiting purposes of the invention.

FIG. 1*a* schematically shows, in a cross-section view, a first sub-assembly of a particle manufacturing device according to the invention.

FIG. 1*b* schematically shows, in a cross-section view, a second sub-assembly of the particle manufacturing device according to the invention.

FIG. 1*c* schematically shows, in a cross-section view along plane A-A of FIG. 1*b*, a third sub-assembly of the particle manufacturing device according to the invention.

FIG. 2 schematically shows a method for manufacturing particles according to the invention.

FIG. 3 shows a particle size distribution.

FIG. 4*a* shows a photograph of a first set of particles.

FIG. 4*b* shows a photograph of a second set of particles.

DETAILED DESCRIPTION

The figures are set forth by way of illustrating and are in no way limiting purposes of the invention. Unless otherwise specified, a same element appearing in different figures has a single reference.

FIGS. 1*a*, 1*b* and 1*c* schematically show one embodiment of a device 200 according to the invention for manufacturing a first and a second powder 5, 6 from a first material 1*a* and a second material 1*b*. The manufacturing device 200 is especially configured to perform one embodiment of a manufacturing method 100 according to the invention, shown in FIG. 2.

Each material 1*a*, 1*b* is electrically conductive. It may for example be a pure metal such as titanium or aluminium or an alloy such as a titanium-based alloy, an aluminium-based alloy, a nickel-based alloy, a copper-based alloy or an iron-based alloy. The materials 1*a*, 1*b* may be of the same nature or even identical. The choice of the composition of each material 1*a*, 1*b* partly determines the composition of the powders 5, 6 obtained.

In the embodiment schematically shown in FIG. 2, the manufacturing method 100 includes the following characteristic steps, represented by rectangles in solid lines:

- a step of melting 110 each material 1*a*, 1*b* by means of an electric arc 314;
- a step of spraying 120 each material 1*a*, 1*b* so as to form droplets 2;
  - a step of cooling 130 the droplets 2, by means of a carrier gas 11, so as to form solid particles 3; and
- a step of separating the particles 3 from the carrier gas 11 and collecting 140 the solid particles 3 so as to form the first and second powders 5, 6.

The manufacturing method 100 may also include a step 160 of enriching the droplets 2 and particles 3. The enrichment 160 is carried out by means of an active substance 16, which will be described in detail below. The enrichment 160 is at least implemented during the cooling step 130. However, enrichment 160 may also begin during spraying 120 and continue during cooling 130.

FIGS. 1*a* and 1*b* schematically show one embodiment of the manufacturing device 200 for carrying out the manufacturing method 100. The manufacturing device 200 includes at least:

- a spraying means 300;
- an atomisation chamber 400;
- a first collection means 500; and
- an exhaust means 600.

The manufacturing device 200 may also include additional elements, shown in FIG. 1*b*, such as:

- a gas/particle separation system 700; and
- a second collection means 800.

FIG. 1*a* schematically shows the spraying means 300, configured to perform:

- the step 110 of melting each material 1*a*, 1*b* by means of an electric arc 314; and
- the step of spraying 120 each material 1*a*, 1*b* so as to form the droplets 2.

The spraying means 300 includes an electric arc source 310, also called a wire arc torch. The wire arc torch 310 is configured to generate an electric arc 314. The arc 314 may be created from carrier gas 11, such as argon, nitrogen or helium or a mixture thereof. The wire arc torch 310 includes an enclosure 311, filled with the carrier gas 11, in which the electric arc 314 is generated. The pressure of the carrier gas 11 in the enclosure 311 may be greater than or equal to atmospheric pressure. The wire arc torch 310 is configured to generate the electric arc 314 between the first material 1*a* and the second material 1*b*. The wire arc torch includes two conductive wires 312*a*, 312*b*, arranged on either side of the enclosure 311, separated from each other and configured to initiate and sustain the electric arc 314 by means of a direct electric current. In operation, the distance between the two conductor wires 312*a*, 312*b* is preferably kept below 5 mm and is dependent on the energy delivered. The voltage applied between the two wires 312*a*, 312*b* may be between 10 V and 30 V. The current flowing through the two conductors 312*a*, 312*b* may be between 100 A and 500 A. In this embodiment of the manufacturing device 200, a first wire 312*a* is made from the first material 1*a* and a second wire 312*b* is made from the second material 1*b*. When the wire arc torch 310 is in operation, the electric arc 314 is located in the vicinity of the two facing ends 313*a*, 313*b* of the two wires 312*a*, 312*b*.

The carrier gas 11 is introduced as a jet into the enclosure 311 through an inlet 313. The jet of carrier gas 11 is configured to strike the ends 313*a*, 313*b* of the two wires 312*a*, 312*b*.

Advantageously, the spraying means 300 comprises several wire arc torches 310 for increasing the amount of powder generated by the manufacturing device 200.

During the melting step 110, the operating regime of the wire arc torch 310 is chosen such that the plasma temperature at the electric arc 314 is higher than the melting temperature of each material 1*a*, 1*b*. Thus, in operation, said plasma melts the ends 313*a*, 313*b* of both wires 312*a*, 312*b*.

The direct involvement of the wires 312*a*, 312*b* in the generation of the plasma at the arc 314 thus ensures that the melting 110 of the materials 1*a*, 1*b* is efficient and localised to the ends 313*a*, 313*b* of the wires 312*a*, 312*b*. This improves the energy efficiency of the manufacturing device 200. Furthermore, it is not necessary to heat the entirety of the wires 312*a*, 312*b* in order to melt them, with melting 110 taking place only at the two ends 313*a*, 313*b*. Melting of materials within a blown or transferred arc plasma is not situated to the ends 313*a*, 313*b* of the wires 312*a*, 312*b*. Thus, it is necessary to bring a larger amount of material to a higher temperature, limiting energy efficiency.

In the spraying step 120, the jet of carrier gas 11 is directly carried onto the liquefied ends 313*a*, 313*b* of the wires 312*a*, 312*b* so as to spray the malting ends 313*a*, 313*b* and create the droplets 2. In order to maintain a fixed spacing between the ends 313*a* and 313*b* despite the spraying of material, the wires 312*a*, 312*b* are fed into the enclosure 311 by an unwinding system, not represented, at a predefined speed.

The plasma temperature at the electric arc 314 is advantageously much higher than the melting temperature of the materials 1*a*, 1*b*. Thus the ends 313*a*, 313*b* reach a high temperature, resulting in a decrease in the surface tension of each of the materials 1*a*, 1*b*. The reduced surface tension facilitates spraying of the materials 1*a*, 1*b* liquefied.

During spraying, the molten materials 1*a*, 1*b* mix within the droplets 2 for obtaining one or more alloys from pure metals. For example, when the first material 1*a* is aluminium and the second material 1*b* is nickel, the droplets 2 sprayed may form an alloy of nickel and aluminium according to the phase diagram of these two elements as thermodynamically defined, for example nickel aluminide NiAl.

At least one of the materials 1*a*, 1*b* may comprise a reagent. For example, the first wire 312*a* may be cored, that is comprising the reagent in the core of the wire, with the first material 1*a* surrounding the reagent and forming a shell around the reagent. When the cored wire 312*a* is melting, during the melting step, the reagent and the first material 1*a* react so as to impart complementary physicochemical characteristics to the first material 1*a*. The reagent may be neither metallic nor electrically conductive. The reagent is an element or mixture of elements that can be involved in the metallurgy of the particles 3. For example, it may be a so-called fluxing agent, that is one that makes it possible to lower the melting temperature of the material, or a cleaning or stripping agent, for example for removing oxidised layers of the wires 312*a*, 312*b*. The reagent may also be a so-called gammagenic element, such as nickel, carbon or even chromium, for steels, with a mass content greater than 8%, making it possible to obtain austenitic particles 3. The reagent may also be alphagenic, such as silicon or even chromium, in the case of steels, with a mass content less than or equal to 8%, making it possible to obtain ferritic particles 3. The reagent comprises, for example, gammagenic elements making it possible to obtain austeno-ferritic steel particles 3. The reagent comprising alphagenic and betagenic elements makes it possible, for example, to obtain titanium alloy particles 3 according to the intended microstructural, mechanical or corrosion properties. The reagent also makes it possible to provide the powders 5, 6 with characteristic physico-chemical properties, such as good flowability, that is a good spreading capacity or a predetermined oxygen or nitrogen content.

FIG. 1*a* schematically shows the atomisation chamber 400 and the exhaust means 600, configured so as to carry out the step of cooling 130 the droplets 2, by means of the carrier gas 11, so as to form the solid particles 3.

The atomisation chamber 400 includes a lid 470, a cylindrical portion 410 and a conical portion 420, sealed together so as to form a first cavity. The atomisation chamber 400 is preferably oriented along a vertical axis z represented by an arrow in FIGS. 1*a* and 1*b*, the arrow extending from the bottom to the top. The lid 470 is disposed on the top of the atomisation chamber 400. The conical portion 420 is disposed on the bottom of the atomisation chamber 400. The cylindrical portion 410 has a diameter $D_R$ of 500 mm or more and a height $Z_R$ of between three and six times this diameter. The opening of the conical part 420 is oriented towards the spraying means 300. The apex of the conical portion 420 is connected to the first collection means 500. The angle α of the opening of the conical portion 420 is between 45° and 80° and improves separation of the particles 3 from gases present in the atomisation chamber 400.

The wire arc torch 300 includes a spray nozzle 360 connected to the lid 470. The spray nozzle 360 is configured to accelerate the carrier gas 11 and the droplets 2 from the enclosure 311 so as to create a spray cone 450 of the carrier gas 11 and the droplets 2 into the atomisation chamber 400. For this, the spray nozzle 360 is configured to accelerate the carrier gas 11 and the droplets 2 to a high, for example supersonic, speed. For example, the spray nozzle 360 may have a conical or Laval-like profile. The carrier gas 11 undergoes expansion within the spray nozzle 360 resulting in a decrease in its temperature. The expansion is preferably dimensioned so that the temperature of the carrier gas 11 from the spray nozzle 360 is lower than the lowest of the solidification temperatures of each material 1*a*, 1*b* or the alloys formed by the materials 1*a*, 1*b* within the droplets 2. Thus, the droplets 2 are cooled and the solid particles 3 are formed by the expansion of the carrier gas 11 only.

In order to accelerate cooling 130, a cooling gas 12 may be injected into the atomisation chamber 400, in which case the lid 470 of the atomisation chamber 400 may comprise at least one inlet 431*a*, 431*b*, to allow injection of the cooling gas 12. Each inlet 431*a*, 431*b* is arranged on the lid 470 so as to surround the spray nozzle 360. Hereafter, the mixture formed by the cooling gas 12 and the carrier gas 11 will be referred to as the "gas mixture" 13. When no cooling gas 12 is injected, the gas mixture 13 will be designated the carrier gas 11 only.

In the cooling step 130, the droplets 2, in contact with the gas mixture 13, establish a heat transfer with the gas mixture 13. Preferably, the temperature of the cooling gas 12 injected is chosen such that it is lower than the lowest of the solidification temperatures of the materials 1*a*, 1*b* or the alloys formed by the materials 1*a*, 1*b* within the droplets 2. The cooling mixture 12 is for example injected at room temperature.

Thus, the carrier gas 11 expanded and the cold cooling gas 12 create heat transfer from the droplets 2 to the gas mixture 13, cooling the droplets 2. When the temperature of the droplets 2 is below the solidification temperature of the droplets 2, the droplets 2 solidify to form the solid particles 3.

The cooling step 130 allows the droplets 2 to spheroidise, that is assume a spherical shape by virtue of the surface tension on the surface of the droplets 2 molten and the interaction with the gas mixture 13. Thus, upon solidifying, the droplets 2 form particles 3 whose sphericity is greater than 0.9 and as close to 1 as possible.

The exhaust means 600 is connected to the cylindrical portion 410 so as to discharge the gas mixture 13. The exhaust means 600 may for example be a duct. The exhaust means 600 is connected at a height $H_R$, measured from the lowest point of the atomisation chamber 400. The height $H_R$ is greater than 500 mm and preferably greater than or equal to 1000 mm, allowing formation of a gas buffer 440. The gas buffer 440, also referred to as a "dead zone", corresponds to a volume in the atomisation chamber 400 where the flow speed of the gas mixture 13 is much lower than the speed of the carrier gas 11 as it exits the spray nozzle 360. Preferably the speed of the gas mixture 13 in the gas buffer 440 is of the order of a few metres per second and even more preferably less than 1 m/s. The gas buffer 440 occupies the entire volume of the atomisation chamber 400 located below the exhaust means 600, in other words, from the lowest point of the atomisation chamber 400 to the connection of the exhaust means to the cylindrical part 410. The diameter of the exhaust means 600 may for example be 300 mm.

The droplets 2 from the spray nozzle 360, and the resulting particles 3, have a high or even supersonic speed. Thus, in the absence of a gas buffer 440, the particles 3 may come into contact with the walls of the manufacturing device 200 and become highly deformed or remain stuck to the walls.

The flow speed of the gas mixture 13 is reduced within the gas buffer 440 and promotes viscous friction between the gas mixture 13, the droplets 2 and the particles 3. The droplets 2 and particles 3 are slowed down before reaching the walls of the device 200. Thus, the deformation of the particles 3 in contact with the walls or the first collection means 500 is limited. The method 100 thus makes it possible to obtain a sphericity of the particles greater than 0.9.

Braking offered by the gas buffer 440 especially makes it possible to reduce the height $Z_R$ of the cylindrical part 410, limiting overall size of the atomisation chamber 400. The total height of the atomisation chamber 400 may for example be less than or equal to 3 m.

The droplets 2 and particles 3 are slowed down by the drag force exerted by the gas buffer 440. The drag force is especially proportional to the density of the fluid in which the droplets 2 and particles 3 move, that is the gas buffer 440. Thus, the higher the density of the gas buffer 440, the better the braking of the droplets 2 and particles 3.

The density of the gas buffer 440 can be increased by controlling its temperature and/or pressure.

The temperature of the gas buffer 440 is preferably kept below 400° C. and even more preferably at or below 100° C. One means to is achieve this is by injecting the cooling mixture 12 at a temperature preferably below 50° C. and even more preferably at or below 30° C. (ambient temperature). The expansion that the carrier gas 11 undergoes as it passes through the spray nozzle 360 reduces its temperature and facilitates keeping the temperature of the gas buffer 440.

The temperature of the gas mixture 13 within the atomisation chamber 400 may vary spatially and temporally. It is especially dependent on heat supplied by solidification of the droplets 2. In one embodiment, the average temperature of the gas mixture 13 above the exhaust means 600 may be as high as 100° C. and the average temperature of the gas mixture 13 at the bottom of the atomisation chamber 400 may be as high as 400° C. Some of the heat may be removed by the exhaust means 600. The gas mixture 13 (and hence the gas buffer 440) may also heat up with the walls of the atomisation chamber 400 by conduction, convection and radiation. In order to improve temperature control of the gas buffer 440, a heat regulation system, such as a heat transfer fluid circulation, may be installed on the walls of the atomisation chamber 440. The production of particles 3 may also be carried out in sequences, spaced by times of cooling the gas buffer 440.

In order to improve braking of the droplets 2 and particles 3, it is advantageous to use a gas mixture 13 including a high density gas, such as argon. The densities are preferably compared under normal temperature and pressure conditions. Indeed, under normal temperature and pressure conditions, argon has a density at least twice as high as neon, nitrogen or even helium and can therefore offer at least twice as much braking.

The drag force is also proportional to the relative speed of the droplets 2 and particles 3 to the speed of the gas mixture 13 within the gas buffer 440. Thus it is preferable that the speed of the gas mixture 13 within the gas buffer 440 is low, preferably less than 1 m/s.

During the cooling step 130, the droplets 2 may come into contact with each other and stick together, increasing the diameter of the resulting particles 3. The droplets 2 may also come into contact with solid particles 3, creating large non-spherical aggregates or satellites on the surface of the solid particles 3. The spray cone 450 makes it possible to increase the distance between the droplets 2, limiting interactions of the droplets 2 with each other during cooling 130. The aperture β of the spray cone 450 allows the droplets 2 and the particles 3 to move away from each other, limiting formation of aggregates during their cooling 130. The opening β of the spray cone 450 is chosen in order to increase distance between the droplets 2 and the particles 3 while limiting impact of the particles 3 with the walls of the cylindrical part 410. The aperture β of the spray cone 450 is for example chosen such that the spray cone 450 has a diameter equal to the diameter $D_R$ of the cylindrical part 410 at the gas buffer 440. The aperture β of the projection cone 450 is for example between 10° and 30°.

In order to limit turbulence and recirculation within the spray cone 450, above the gas buffer 440, the ratio of the volume flow rate of the carrier gas 11 from the spray nozzle 360 and the volume flow rate of the cooling gas 12 is preferably 2 to 1. According to one embodiment, the volume flow rate of the gas mixture 13 is 120 $m^3$/h.

The enrichment step 160 is combined with the manufacturing method 100. By "enrichment", it is meant a metallurgical treatment of the materials 1*a*, 1*b* and alloys formed within the droplets 2 by means of an active substance 16 so as to provide the resulting particles 3 with characteristic physico-chemical characteristics.

The active substance 16 implemented in the enrichment step 160 includes:

- at least one neutral gas, advantageously of the same composition as the carrier gas 11; and
- at least one active compound comprising at least one of the following atoms: oxygen, nitrogen, carbon or hydrogen.

Each active compound may be in the gas, liquid or solid phase, for example, present in the form of droplets or suspended particles. The content of each active compound in the active substance 16 is between 5 ppm and 20,000 ppm and preferably between 5 ppm and 1000 ppm. This can be, for example, carbon monoxide or hydrogen.

The active compound of the active substance 16 may be a hydrocarbon, such as methane, rich in carbon and hydrogen. In case the active substance 16 includes carbon monoxide or methane, the enrichment 160 corresponds to carburising of the materials 1*a*, 1*b*. If the active substance 16 includes nitrogen, the enrichment 160 corresponds to nitriding. If the active substance 16 includes oxygen or hydrogen, the enrichment 160 corresponds to oxidation or otherwise reduction of the materials 1*a*, 1*b*. The active substance 16 can react with the materials 1*a*, 1*b* whether they are in the form of droplets 2 or solid particles 3.

The active substance 16 is preferably injected into the device 200 at the atomisation chamber 400. Thus the active substance 16 reacts with the particles 3. Advantageously, the active substance 16 is involved in the spraying step 120. In this way the active substance 16 reacts with the droplets 2. Alternatively, the active substance 16 is also injected at the spraying means 300. Partial pressures of the neutral gas and of each active compound of the active substance 16 are controlled within the device 200 throughout the method 100 so that the content of each active compound remains between 5 ppm and 20,000 ppm and preferably between 5 ppm and 1000 ppm.

Chemical reactions taking place between the active substance 16 and the surface of the droplets 2 and the particles 3 make it possible to optimise the exchange surface area. In this way, the enrichment step 160 is efficiently carried out. Thus the enrichment step 160 allows the final chemical composition of the resulting particles 3 to be controlled.

A first part of the solid particles 3, slowed down by the gas buffer 440, falls to the bottom of the atomisation chamber 400 and converges towards the bottom of the atomisation chamber 400, in order to be collected by the first collection means 500. The angle of the conical portion 420 allows the first portion of the particles 3 to be conveyed to the collection means limiting accumulation of the particles 3 in the atomisation chamber 400. A first valve 460 is located at the top of the conical portion for closing the duct to the first collection means 500, in order to isolate the atomisation chamber 400 from outside.

A second part of the particles 3, mainly formed by the lighter particles, is carried by the gas mixture 13 out of the atomisation chamber 400 through the exhaust means 600.

FIG. 1*a* schematically shows the first collection means 500, configured to perform the step 140 of collecting the first solid particle portion 3 so as to form the first powder 5.

The first collection means 500 is connected to the atomisation chamber 400 through the top of the conical portion 420. The first collection means 500 comprises a main jar 520 configured to contain the first powder 5. The first collection means 500 comprises a second valve 530 for isolating the main jar 520 from the rest of the manufacturing device 200. When the first and second valves 460, 530 are closed, the first collection means 500 can be disconnected from the manufacturing device 200 by virtue of a first interface 550, in order to be, for example, moved or replaced. The first collection means 500 comprises a first temperature probe 560 configured to measure the maximum temperature within the first powder 5 in the main jar 520. The first collection means 500 also includes a first gas inlet 541 and a first gas outlet 542, for circulating a passivation gas 14 within the main jar 520, in order to perform, for example, a passivation step 170. The first gas inlet and outlet 541, 542 are closed by two first closure valves 544, 543 outside the passivation step 170. The main jar 520 includes a first gas diffusion gate 570 on the bottom of the jar 520, the pore diameter of which is smaller than the diameter of the powder particles recovered, so as to ensure better distribution of the passivation gas 14 within the powder bed 5.

FIG. 1*b* schematically shows the gas/particle separation system 700, configured to separate the second part of the particles 3 from the gas mixture 13. The gas/particle separation system 700 may, for example, be a filtration means, a settler or even a cyclone.

In the embodiment shown in FIG. 1*b*, the gas/particle separation system 700 is a cyclone. The cyclone 700 is preferably oriented along the vertical axis z and comprises a cylindrical body 730 having height $L_C$ and diameter $D_C$. The cyclone 700 also includes a conical body 740 having height $Z_C$. The cylindrical body 730 is sealed to the conical body 740 so as to create a second cavity. The top of the conical body 740 includes an opening, having diameter $D_U$, to the collection means 800. The cyclone 700 includes an outlet duct 720, having diameter Do, disposed on the top of the cyclone 700, partially penetrating the second cavity by a distance Sc. The cyclone 700 includes an inlet duct 710 having height $H_C$.

FIG. 1*c* schematically shows a cross-section view along plane A-A of the cyclone 700 of FIG. 1*b* for viewing the width $B_C$ of the inlet duct 710. A first opening 711 of the inlet duct 710 is connected to the exhaust means 600 so that the gas mixture 13 can enter the cyclone 700. The inlet duct 710 leads to the second cavity through a second opening 712 in a wall of the cylindrical body 730.

The cyclone may be sized according to the speed of the gas mixture 13 entering the cyclone and so-called Lapple dimensional ratios. However, another type of cyclone may be implemented, chosen especially according to the materials 1*a*, 1*b* being sprayed and the hydrodynamics of the gas mixture 13. The speed of the gas mixture 13 is preferably between 6 m/s and 21 m/s. Lapple dimensional ratios are for example:

$$B_C/D_C = 0.25;$$

$$H_C/D_C = 0.50;$$

$$D_O/D_C = 0.50;$$

$$D_U/D_C = 0.25;$$

$$S_C/D_C = 0.62;$$

$$L_C/D_C = 2; \text{ and}$$

$$Z_C/D_C = 2.$$

In operation, the gas mixture 13 and the second portion of the particles 3 enter the cyclone 700 through the inlet duct 710. The second portion of the particles 3 is separated from the gas mixture 13 by virtue of the centrifugal force exerted on each particle 3, the centrifugal force resulting from the circular trajectory 7 of the gas mixture 13 through the cyclone 700. The conical body 740 gathers the second part of the particles 3 towards the second collection means 800. The gas mixture 13, freed from the second part of the particles 3, leaves the separation system 700 through the outlet duct 720. The conical body 740 comprises at its top a third valve 760 for closing the duct to the second collection means 800, in order to isolate the gas/particle separation system 700 from outside.

FIG. 1*b* also schematically shows the second collection means 800, comparable to the first collection means 500. The second collection means 800 comprises a secondary jar 820 configured to accommodate the second portion of the particles 3 so as to form the second powder 6. The second collection means 800 comprises a fourth valve 810 for isolating the second collection means 800. When the third and fourth valves 760, 810 are closed, the second collection means 800 can be disconnected from the gas/particle separation system 700 by virtue of a first interface 750, in order to be moved to, for example, make the second powder 6 available to additive manufacturing equipment. The second collection means 800 comprises a second temperature probe 840 configured to measure the temperature within the second powder 6. The second collection means 800 also includes a second gas inlet 831 and a second gas outlet 832, for circulating the passivation gas 14 to perform, for example, the passivation step 170. The second gas inlet and outlet 831, 832 are closed by two second closure valves 833, 834 outside the passivation 170 so as to control the atmosphere of the second collection means 800. The secondary jar 820 includes a second gas diffusion gate 850 on the bottom of the jar 820, the pore diameter of which is smaller than the diameter of the particles 3 recovered, so as to ensure better distribution of the passivation gas 14 within the powder bed 6.

During the gas/particle separation and collection step 140, the first part of the particles 3, separated from the gas mixture 13 by inertia, converges towards the top of the conical portion 420. The aperture angle α of the conical portion 420 prevents accumulation of particles 3 in the atomisation chamber 400 and allows the first portion of the particles 3 to be efficiently transferred to the first collection means 500. The first portion of the particles 3 is collected in the main jar 520 so as to form the first powder 5. Once the first portion of the particles 3 is collected, the first collection means 500 is isolated from the manufacturing device 200 by means of the first and second valves 460, 530.

The second portion of the particles 3, separated from the gas mixture 13 by means of the separation system 700, converges towards the top of the conical body 740 so as to be transferred to the second collection means 800. The second part of the particles 3 is pooled in the secondary jar 820 so as to form the second powder 6. Once the second part of the particles 3 is collected, the second collection means 800 is isolated from the manufacturing device 200 by means of the third and fourth valves 760, 810.

The first powder 5 and the second powder 6 are of the same nature and include particles 3 whose chemical composition is equivalent, that is whose chemical constituents vary by less than 5%. However, the second powder 6 includes particles 3 which are smaller and lighter than the particles forming the first powder 5.

The first powder 5 and the second powder 6 can be stored and used separately or mixed so as to form one and a single powder.

In FIG. 2, the manufacturing method 100 shown schematically includes several combinable steps, shown in dotted lines, which will now be described.

An ionisation step 150 can be combined with the enrichment step 160 in order to improve kinetics of the chemical reactions taking place between the droplets 2, the particles 3 and the active substance 16.

The ionisation step 150 precedes the enrichment step 160, in which case the enrichment step may start during spraying 120. In this step, the active substance 16 may be introduced into the chamber 311 of the spraying means 300 so as to be ionised by the electric arc 314. The electric arc 314 ionises each component of the active substance 16 so as to create reactive free ions. The reactive free ions, being highly energetic, improve kinetics of the reactions in the enrichment step 160. The enrichment reactions are therefore balanced before the droplets 2 are solidified. Thus, the chemical composition of the resulting particles 3 is controlled and reproducible.

The concentration of reactive free ions is highest within the enclosure 311. Outside the enclosure the concentration of free reactive ions decreases due to recombination reactions. Advantageously, the reactive free ions follow the trajectory of the droplets 2 in the atomisation chamber 400 to increase the duration of the enrichment step 160.

Following the collection step 140, the step 170 of passivating the surface of the particles 3 may be performed, for example, in the case where the first and second powders 5, 6 are manufactured from flammable materials, that is having a high affinity with oxygen. This is for example the case with powders 5, 6 formed from titanium, and titanium or aluminium alloys. The passivation step 170 is carried out by means of passivation gas 14. The passivation gas 14 may for example include a noble gas and an active gas such as oxygen, the active gas preferably having a concentration between 20 ppm and 2%. The passivation step 170 is carried out systematically on both powders 5, 6. In the following example, the performance of the passivation step 170 on the first powder 5 in the first collection means 500 is set forth. The passivation step 170 is transposable to the second collection means 800.

Firstly the second valve 530 is closed allowing the first collection means 500 to be isolated from the rest of the manufacturing device 200. A waiting time allows the first powder 5 to cool down before the closing valves 543, 544 are opened. The waiting time, for example 15 min, is defined so that the maximum temperature of the first powder 5 is below a threshold temperature, for example 40° C. Advantageously, the first temperature probe 560 makes it possible to measure the maximum temperature of the first powder 5 in real time and to trigger opening of the shut-off valves 543, 544 as soon as the maximum temperature of the first powder 5 is less than 40° C. The first temperature probe 560 thus makes it possible to reduce or increase the waiting time when the cooling of the first powder 5 is fast or otherwise slow. When the initially closed closing valves 543, 544 are opened, the passivation gas 14 circulates in the main jar 520. Advantageously, the passivation gas 14 circulates from the bottom of the main jar 520 to the top so as to diffuse between each particle 3 and thus act uniformly on each of them. The duration of the circulation of the passivation gas 14 can be set. However, as the passivation reaction is exothermic, the circulation time of the passivation gas 14 can be controlled by the first temperature probe 560.

In order to obtain a first and a second powder 5, 6 meeting particle size distribution characteristics, a sieving step 180 may be performed on the first and the second powder 5, 6. Sieving 180 allows, for example, the powders 5, 6 to be dispensed with particle aggregates 3 or of particles 3 exceeding a boundary size. The particle size distribution can be characterised by three particular diameters $D_{10}$, $D_{50}$ and $D_{90}$. For example, 10% of the particles 3 have a diameter smaller than $D_{10}$, 50% of the particles 3 have a diameter smaller than $D_{50}$ and 90% of the particles 3 have a diameter smaller than $D_{90}$. Sieving 180 may for example be performed to adjust distribution of the powders 5, 6, especially the diameter $D_{50}$, corresponding to the median of the distribution.

In order for the chemical composition of the powders 5, 6 to be reproducible, the manufacturing device 200 may undergo an inerting step 101. The inerting step 101 is performed by means of an inerting gas, in order to purge air contained in the device 200 until the oxygen content is less than 100 ppm, preferably less than 10 ppm, before starting the melting step 110. The inerting gas may for example include a neutral gas or a mixture of neutral gases.

FIG. 3 schematically shows a particle size distribution curve Q(D) of particles 3 obtained experimentally by the manufacturing method 100. The curve Q(D) corresponds to the normalised distribution of the particles 3 as a function of their diameters D. The three hatched zones represent the range of diameters between 5 μm and 150 μm. The double hatched zone represents the diameter range from 10 μm to 63 μm. The particle size distribution Q(D) shows a maximum for a diameter D=63 μm. Thus, the manufacturing method 100 makes it possible to manufacture powders 5, 6 that meet the requirements of additive manufacturing methods.

FIGS. **4*a* and 4*b* show two photographs of a first set and a second set of particles 3 manufactured by the manufacturing method 100. Both photographs are taken by scanning electron microscopy. Both photographs show the particles 3** to be spherical and, for the most part, lacking a satellite on the surface.

The invention claimed is:

1. A method for manufacturing powder from a first material and a second material, the manufacturing method comprising:

a step of melting the first and second materials, by an electric arc, to form first and second molten materials;

a step of spraying the first and second molten materials with a carrier gas so as to form droplets;

a step of cooling the droplets by the carrier gas and a cooling gas so as to form solid particles with a particle size distribution between 5 μm and 150 μm;

a step of enriching the droplets and/or the particles by an active substance, implemented during the cooling step, the enrichment step being preceded by a step of ionising the active substance; and a step of separating the solid particles from the carrier gas and collecting the solid particles so as to form the powder, wherein the carrier gas and the cooling gas present a volume flow ratio of 2 to 1.

2. The manufacturing method according to claim 1, wherein the active substance comprises:

at least one neutral gas; and at least one active compound comprising at least one of the following atoms:

oxygen, nitrogen, carbon or hydrogen;

each active compound being in the gas, liquid or solid phase, the content of each active compound being between 5 ppm and 20,000 ppm.

3. The manufacturing method according to claim 1, wherein the enrichment step is implemented during the spraying and cooling steps.

4. The manufacturing method according to claim 1, wherein the cooling gas is injected at a temperature below 50° C.

5. The manufacturing method according to claim 1, wherein, in addition to the carrier gas, the cooling step is performed by a gas buffer.

6. The manufacturing method according to claim 5, wherein the temperature of the gas buffer is kept below 400° C.

7. The manufacturing method according to claim 5, wherein the gas buffer comprises a gas, the gas being argon.

8. The manufacturing method according to claim 7, wherein the speed of the gas within the gas buffer is less than 1 m/s.

9. The manufacturing method according to claim 5, wherein the manufacturing method is performed in sequences and wherein the sequences are spaced apart by times of cooling the gas buffer.

10. The manufacturing method according to claim 1, wherein the steps of the method are implemented by a manufacturing device, said method comprising a step of inerting the manufacturing device by a neutral gas, for purging the manufacturing device, the melting step being triggered subsequently to the inerting step.

11. The manufacturing method according to claim 1, wherein the collection step is followed by a step of passivating the particles.

12. The manufacturing method according to claim 11, wherein the passivation step is triggered when the maximum temperature of the powder is below a threshold temperature.

13. The manufacturing method according to claim 11, wherein the passivation step is triggered after a set waiting time.

14. The manufacturing method according to claim 11, wherein the duration of the passivation step is controlled as a function of the temperature of the powder.

15. The manufacturing method according to claim 11, wherein the duration of the passivation step is set.

16. The manufacturing method according to claim 1, wherein the particle size distribution of the solid particles is between 10 μm and 63 μm.

* * * * *